United States Patent
Behboodi et al.

(10) Patent No.: US 12,452,108 B2
(45) Date of Patent: Oct. 21, 2025

(54) EQUIVARIANT GENERATIVE PRIOR FOR INVERSE PROBLEMS WITH UNKNOWN ROTATION

(71) Applicant: QUALCOMM Incorporated, San Diego, CA (US)

(72) Inventors: Arash Behboodi, Amsterdam (NL); Anna Kuzina, Amstelveen (NL); Fabio Valerio Massoli, Amsterdam (NL); Kumar Pratik, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 18/100,263

(22) Filed: Jan. 23, 2023

(65) Prior Publication Data

US 2023/0239179 A1    Jul. 27, 2023

Related U.S. Application Data

(60) Provisional application No. 63/303,938, filed on Jan. 27, 2022.

(51) Int. Cl.
    *H04L 25/02*    (2006.01)
(52) U.S. Cl.
    CPC ................. *H04L 25/0242* (2013.01)
(58) Field of Classification Search
    CPC .......... H04L 25/0242; H04L 25/0254
    USPC ....................................... 455/130
    See application file for complete search history.

(56) References Cited

U.S. PATENT DOCUMENTS

| | | | |
|---|---|---|---|
| 2006/0023653 A1* | 2/2006 | Montalbano | H04L 25/0204 370/315 |
| 2017/0141858 A1* | 5/2017 | Mege | H04B 17/309 |
| 2020/0396575 A1* | 12/2020 | Kim | G06N 3/088 |
| 2022/0398697 A1* | 12/2022 | Vahdat | G06N 3/0464 |

OTHER PUBLICATIONS

Bora A., et al., "Compressed Sensing Using Generative Models", Proceedings of the 34th International Conference on Machine Learning, vol. 70, Proceedings of Machine Learning Research (PMLR), 2017, 10 pages.

Whang J., et al., "Composing Normalizing Flows for Inverse Problems", Proceedings of the 38 th International Conference on Machine Learning, PMLR 139, 2021, 12 Pages.

Kuzina, A., (Qualcomm) et al., "Equivariant Generative Prior for Inverse Problems with Unknown Rotation", Jan. 12, 2022, 24 Pages.

Baur M., et al., "CSI Clustering with Variational Autoencoding", arxiv.org, Cornell University Library, 201 Olin Library Cornell University Ithaca, NY 14853, Nov. 18, 2021, XP091101562, 5 pages, p. 1-p. 3 figure 1.

(Continued)

*Primary Examiner* — Don N Vo
(74) *Attorney, Agent, or Firm* — Seyfarth Shaw LLP

(57) ABSTRACT

A processor-implemented method for estimating a channel by a deep generative model includes receiving, at a device, an observation of the channel and mapping, at the device, the observation to a mean value associated with the channel and a covariance matrix associated with the channel. The processor-implemented method also includes reconstructing, at the device, the channel based on the mean value and the covariance matrix.

30 Claims, 10 Drawing Sheets

(56) References Cited

OTHER PUBLICATIONS

Hy S.T., et al., "Multiresolution Graph Variational Autoencoder", arxiv.org, Cornell University Library, 201 Olin Library Cornell University Ithaca, NY 14853, Jun. 2, 2021, XP081982917, pp. 1-28, p. 6, paragraph section 4.1 p. 15.
International Search Report and Written Opinion—PCT/US2023/011460—ISA/EPO—Apr. 17, 2023.
Kuzina A., et al., "Equivariant Priors for Compressed Sensing with Unknown Orientation", arxiv.org, Cornell University Library, 201 Olin Library Cornell University Ithaca, NY 14853, Jun. 28, 2022, XP091258808, 19 pages.

\* cited by examiner

EQUIVARIANT GENERATIVE PRIOR FOR INVERSE PROBLEMS WITH UNKNOWN ROTATION

CROSS-REFERENCE TO RELATED APPLICATION

The present application claims the benefit of U.S. Provisional Patent Application No. 63/303,938, filed on Jan. 27, 2022, and titled "EQUIVARIANT GENERATIVE PRIOR FOR INVERSE PROBLEMS WITH UNKNOWN ROTATION," the disclosure of which is expressly incorporated by reference in its entirety.

FIELD OF THE DISCLOSURE

Aspects of the present disclosure generally relate to wireless communications, and more particularly, to estimating a wireless channel using an equivariant generative prior.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipments (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks (DCN), are a type of feed-forward artificial neural network. Convolutional neural networks may include layers of neurons that may be configured in a tiled receptive field. It would be desirable to apply neural network processing to wireless communications to achieve greater efficiencies.

SUMMARY

In one aspect of the present disclosure, a method for estimating a channel by a deep generative model includes receiving an observation of the channel. The method further includes mapping the observation to a mean value associated with the channel and a covariance matrix associated with the channel. The method still further includes reconstructing the channel based on the mean value and the covariance matrix.

Another aspect of the present disclosure is directed to an apparatus including means for receiving an observation of the channel. The apparatus further includes means for mapping the observation to a mean value associated with the channel and a covariance matrix associated with the channel. The apparatus still further includes means for reconstructing the channel based on the mean value and the covariance matrix.

In another aspect of the present disclosure, a non-transitory computer-readable medium with non-transitory program code recorded thereon is disclosed. The program code is executed by a processor and includes program code to receive an observation of the channel. The program code further includes program code to map the observation to a mean value associated with the channel and a covariance matrix associated with the channel. The program code still further includes program code to reconstruct the channel based on the mean value and the covariance matrix.

Another aspect of the present disclosure is directed to an apparatus having a processor, and a memory coupled with the processor and storing instructions operable, when executed by the processor, to cause the apparatus to receive an observation of the channel. Execution of the instructions further cause the apparatus to map the observation to a mean value associated with the channel and a covariance matrix associated with the channel. Execution of the instructions also cause the apparatus to reconstruct the channel based on the mean value and the covariance matrix.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
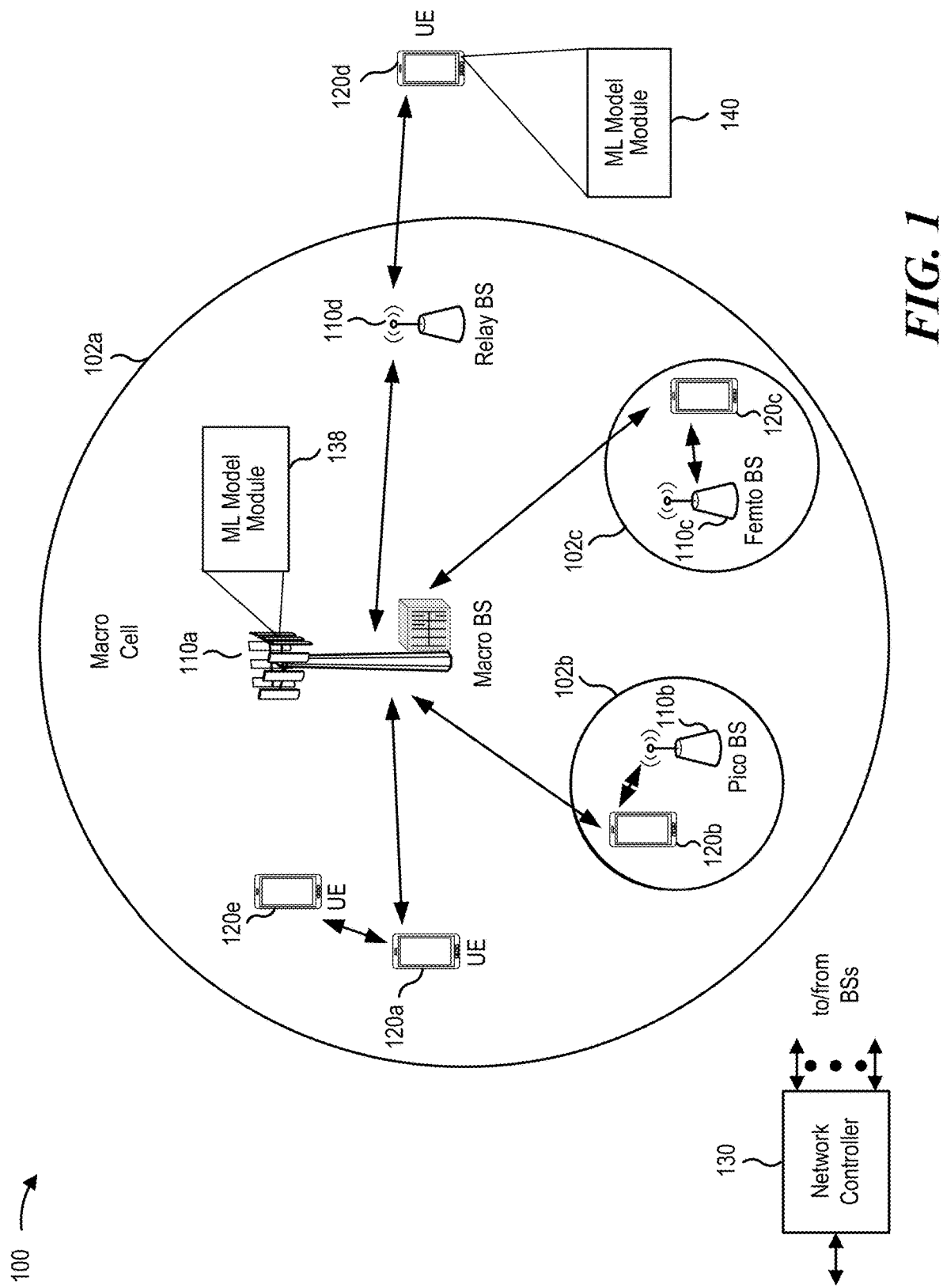
FIG. 1 is a block diagram conceptually illustrating an example of a wireless communications network, in accordance with various aspects of the present disclosure.

Various aspects of the disclosure are described more fully below with reference to the accompanying drawings. This disclosure may be embodied by one or more elements of a claim may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G, 4G, and/or 6G technologies.

Artificial neural networks, such as deep generative models, may be used to estimate a channel, such as a wireless channel. A variational autoencoder (VAE) is an example of a deep generative model. During training, an encoding distribution of the VAE may be regularized, such that a latent space of the VAE may generate new data. In some examples, the VAE may estimate a channel or properties associated with the channel based on one or more observations of the channel. In one such example, for medical imaging, the VAE may generate an entire image of an organ based on receiving one or more observations of the organ. As another example, upon receiving one or more observations of a channel, such as pilot symbols associated with the channel, the VAE may generate the channel, or properties associated with the channel, by finding the latent variable that generates the channel.

In some examples, compressed sensing may reconstruct a signal from an underdetermined system of linear measurements. The compressed sensing solution may use prior knowledge of the signal to reconstruct the signal. In some examples, the signal, or an object, has an unknown orientation, prior to measurements. As an example, an orientation of a user equipment (UE) with respect to a base station or a beam direction may be unknown. As another example, a pose of the organ may be unknown. Thus, conventional compressed sensing solutions may fail to reconstruct the signal with an unknown orientation.

Various aspects of the present disclosure are directed to using equivariant priors to solve inverse problems with unknown orientations. In some examples, an equivariant generative model encapsulates orientation information in its latent space. The equivariant generative model may include an equivariant variational autoencoder (VAE). The VAE may include an equivariant encoder and an equivariant decoder. The encoder of the VAE may include two sub-parts. A first part may model an equivariant mean value μ(x). A second part may model a covariance by learning a full rank equivariant matrix V(x). The covariance may be based on the equivariant matrix V(x) and a transpose of the equivariant matrix $V(x)^T$. In such aspects, a signal with an unknown orientation may be recovered with iterative gradient descent on the latent space of the equivariant generative model.

Various aspects of the present disclosure may be applied to estimating one or more communication properties, such as estimating a channel, a delay, and/or a Doppler shift. Various aspects of the present disclosure may be applied to mmWave and/or massive multiple-input multiple-output (MIMO) channel estimation. In some examples, an orientation may be estimated and additional sensors may be used to estimate other communication properties based on the estimated orientation.

Particular aspects of the subject matter described in this disclosure can be implemented to realize one or more of the following potential advantages. In some examples, by estimating a channel via an equivariant VAE of a deep generative model, aspects of the present disclosure reduce a convergence time and also reduce network latency by reducing a time associated with estimating the channel.

FIG. 1 is a diagram illustrating a network 100 in which aspects of the present disclosure may be practiced. The network 100 may be a 5G or NR network or some other wireless network, such as (but not limited to) an LTE network. The wireless network 100 may include a number of base stations (BS) 110 (shown as BS 110a, BS 110b, BS 110c, and BS 110d) and other network entities. A BS is an entity that communicates with user equipment (UE) and may also be referred to as a base station, a NR BS, a Node B, a gNB, a 5G node B, an access point, a transmit and receive point (TRP), a network node, a network entity, and/or the like. A BS can be implemented as an aggregated base station, as a disaggregated base station, an integrated access and backhaul (IAB) node, a relay node, a sidelink node, etc. The BS can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul (not shown). The BSs may also communicate with one another, e.g., directly or indirectly via a wireless or wireline backhaul (not shown).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be (but is not limited to) a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a machine learning (ML) module 140. For brevity, only one UE 120d is shown as including the machine learning (ML) module 140. The ML configuration module 140 may receive an observation of the channel; map the observation to a mean value associated with the channel and a covariance matrix associated with the channel; and reconstruct the channel based on the mean value and the covariance matrix.

The base stations 110 may include a machine learning (ML) module 138. For brevity, only one base station 110a is shown as including the machine learning (ML) module 138. In various aspects, the ML configuration module 138 may receive an observation of the channel; map the observation to a mean value associated with the channel and a covariance matrix associated with the channel; and reconstruct the channel based on the mean value and the covariance matrix.

As indicated above, FIG. 1 is provided merely as an example. Other examples may differ from what is described with regard to FIG. 1.

Figure 2:
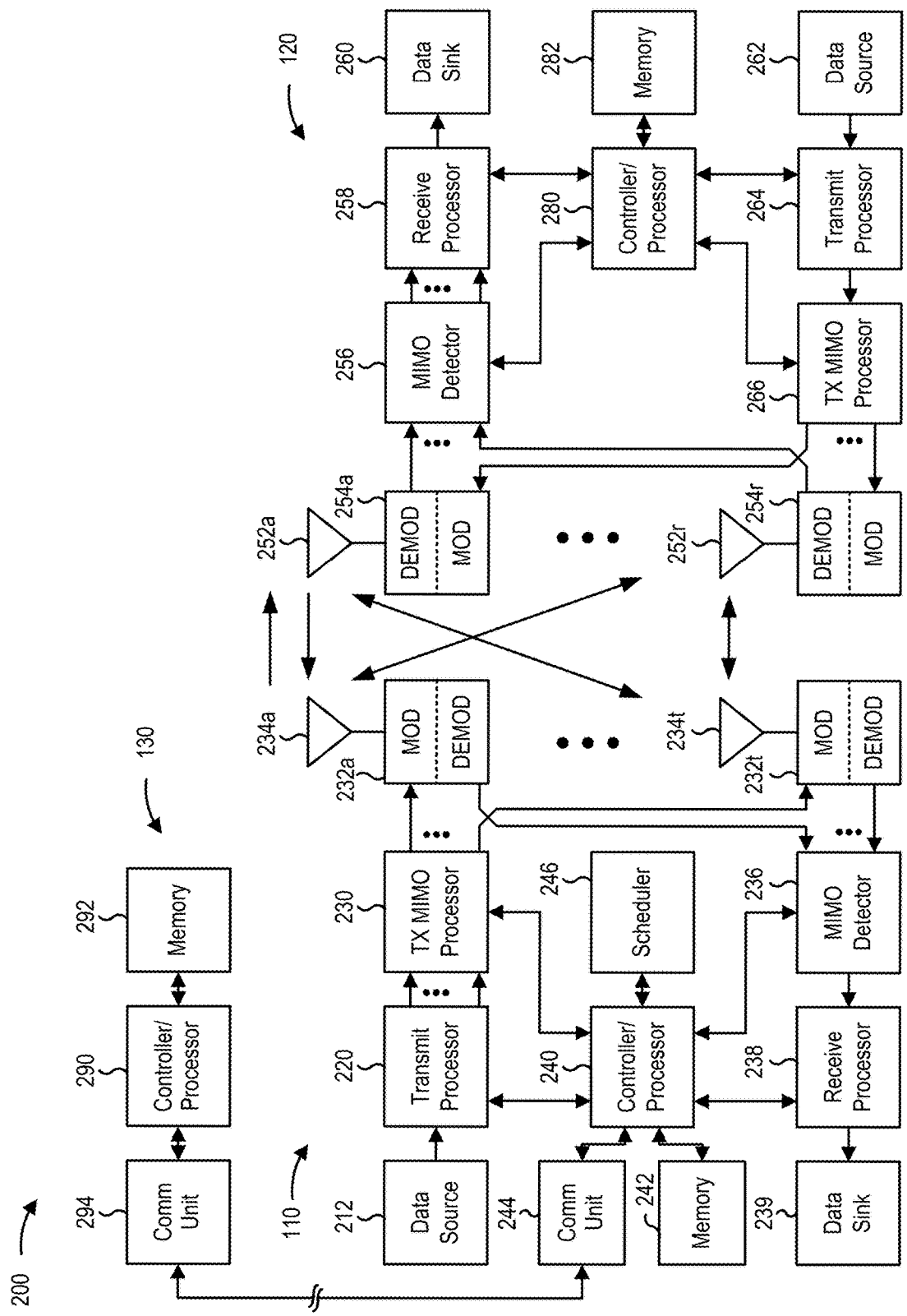
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for reconstructing a channel as described in more detail elsewhere. For example, the controller/processor 240 of the base station 110, the controller/processor 280 of the UE 120, and/or any other component(s) of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or the base station 110 may include means for receiving an observation of the channel; means for mapping the observation to a mean value associated with the channel and a covariance matrix associated with the channel; and means for reconstructing the channel based on the mean value and the covariance matrix. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
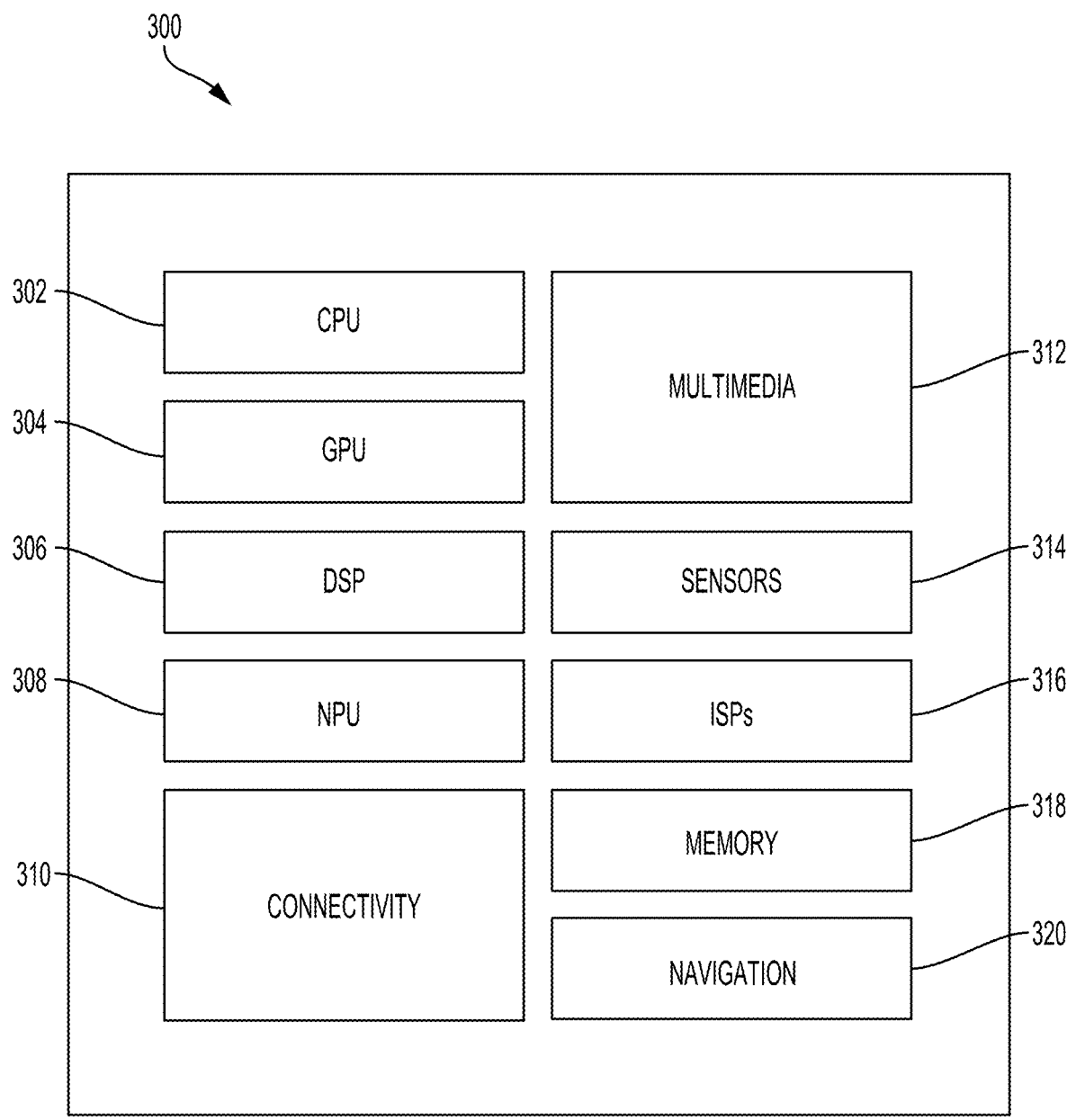
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive an observation of the channel; code to map the observation to a mean value associated with the channel and a covariance matrix associated with the channel; and code to reconstruct the channel based on the mean value and the covariance matrix.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
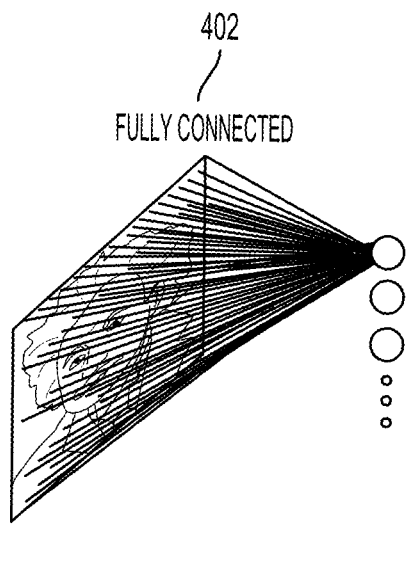
FIGS. 4A, 4B, and 4C are diagrams illustrating a neural network, in accordance with aspects of the present disclosure.
Figure 4B:
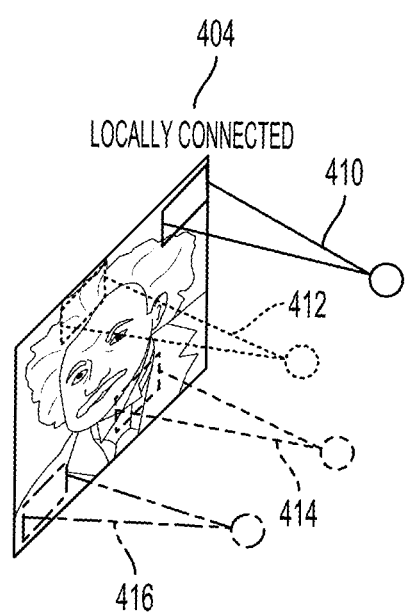

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer because the higher layer neurons in a given region may receive inputs that are tuned through training to the properties of a restricted portion of the total input to the network.

Figure 4C:
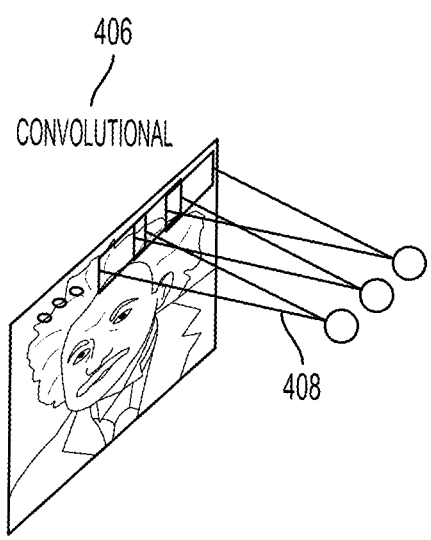

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
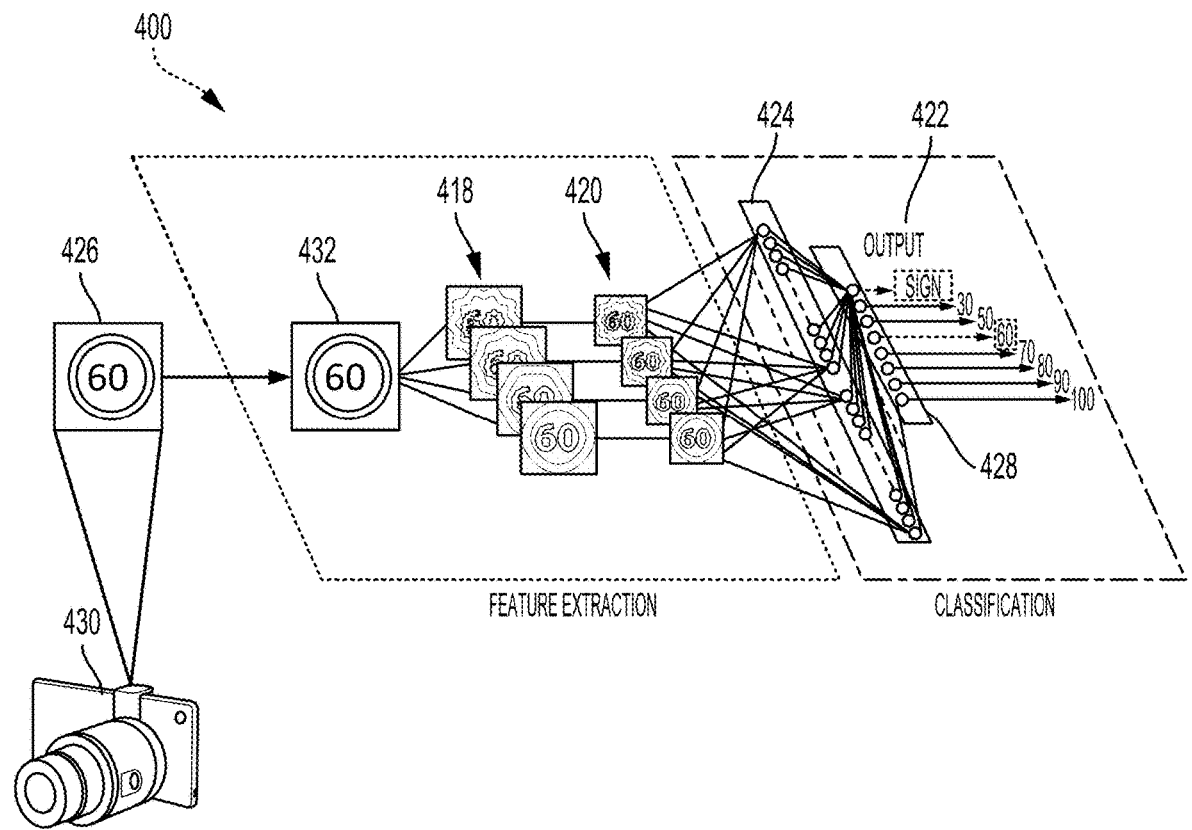
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 may be a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 may likely be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 400 may be presented with new images (e.g., the speed limit sign of the image 426) and a forward pass through the DCN 400 may yield an output 422 that may be considered an inference or a prediction of the DCN 400.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
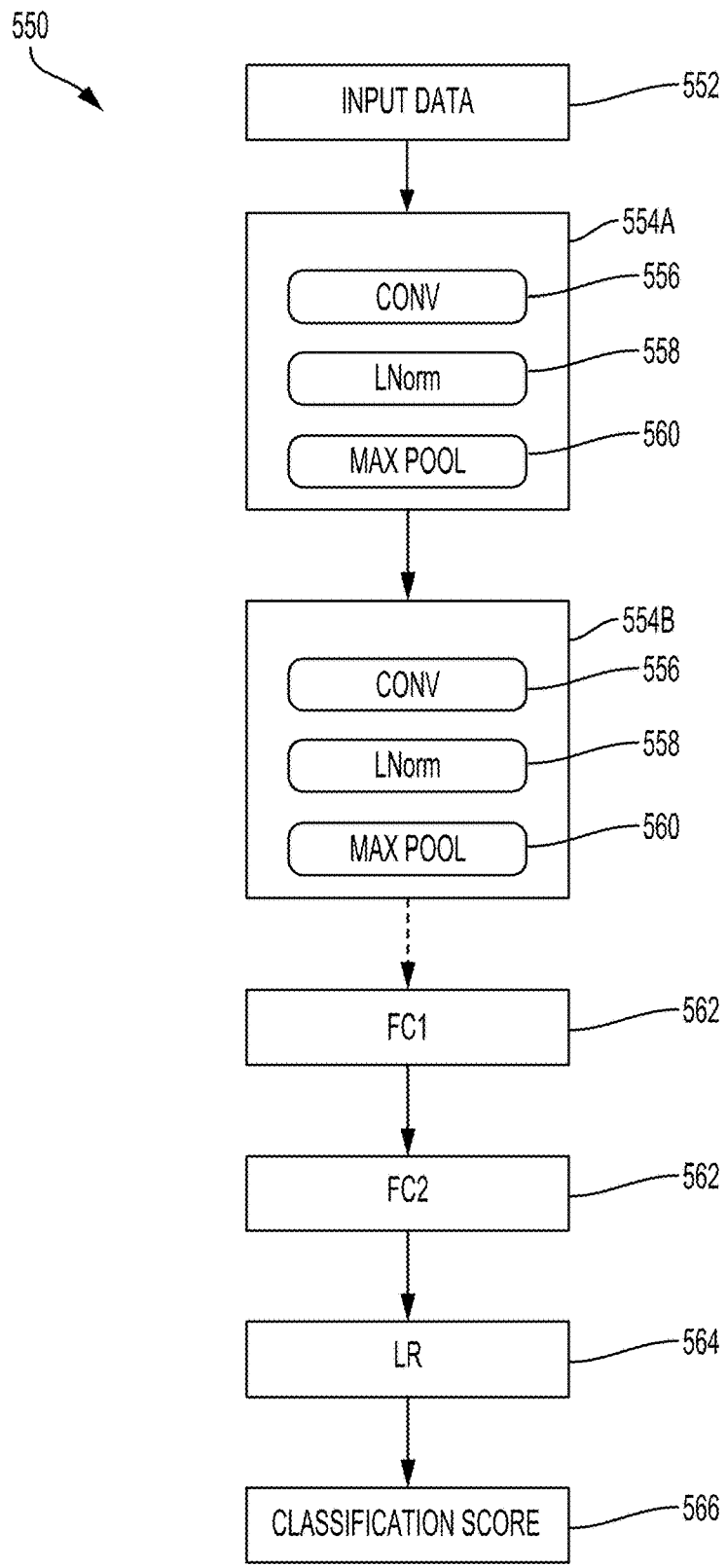
FIG. 5 is a block diagram illustrating an exemplary deep convolutional network (DCN), in accordance with aspects of the present disclosure.

FIG. 5 is a block diagram illustrating a DCN 550. The DCN 550 may include multiple different types of layers based on connectivity and weight sharing. As shown in FIG. 5, the DCN 550 includes the convolution blocks 554A, 554B. Each of the convolution blocks 554A, 554B may be configured with a convolution layer (CONV) 556, a normalization layer (LNorm) 558, and a max pooling layer (MAX POOL) 560. Although only two of the convolution blocks 554A, 554B are shown, the present disclosure is not so limiting, and instead, any number of the convolution blocks 554A, 554B may be included in the DCN 550 according to design preference.

The convolution layers 556 may include one or more convolutional filters, which may be applied to the input data to generate a feature map. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 (e.g., FIG. 3) to achieve high performance and low power consumption. In alternative embodiments, the parallel filter banks may be loaded on the DSP 306 or an ISP 316 of an SOC 300. In addition, the DCN 550 may access other processing blocks that may be present on the SOC 300, such as sensor processor 314 and navigation module 320, dedicated, respectively, to sensors and navigation.

The DCN 550 may also include one or more fully connected layers 562 (FC1 and FC2). The DCN 550 may further include a logistic regression (LR) layer 564. Between each layer 556, 558, 560, 562, 564 of the DCN 550 are weights (not shown) that are to be updated. The output of each of the layers (e.g., 556, 558, 560, 562, 564) may serve as an input of a succeeding one of the layers (e.g., 556, 558, 560, 562, 564) in the DCN 550 to learn hierarchical feature representations from input data 552 (e.g., images, audio, video, sensor data and/or other input data) supplied at the first of the convolution blocks 554A. The output of the DCN 550 is a classification score 566 for the input data 552. The classification score 566 may be a set of probabilities, where each probability is the probability of the input data, including a feature from a set of features.

Figure 6:
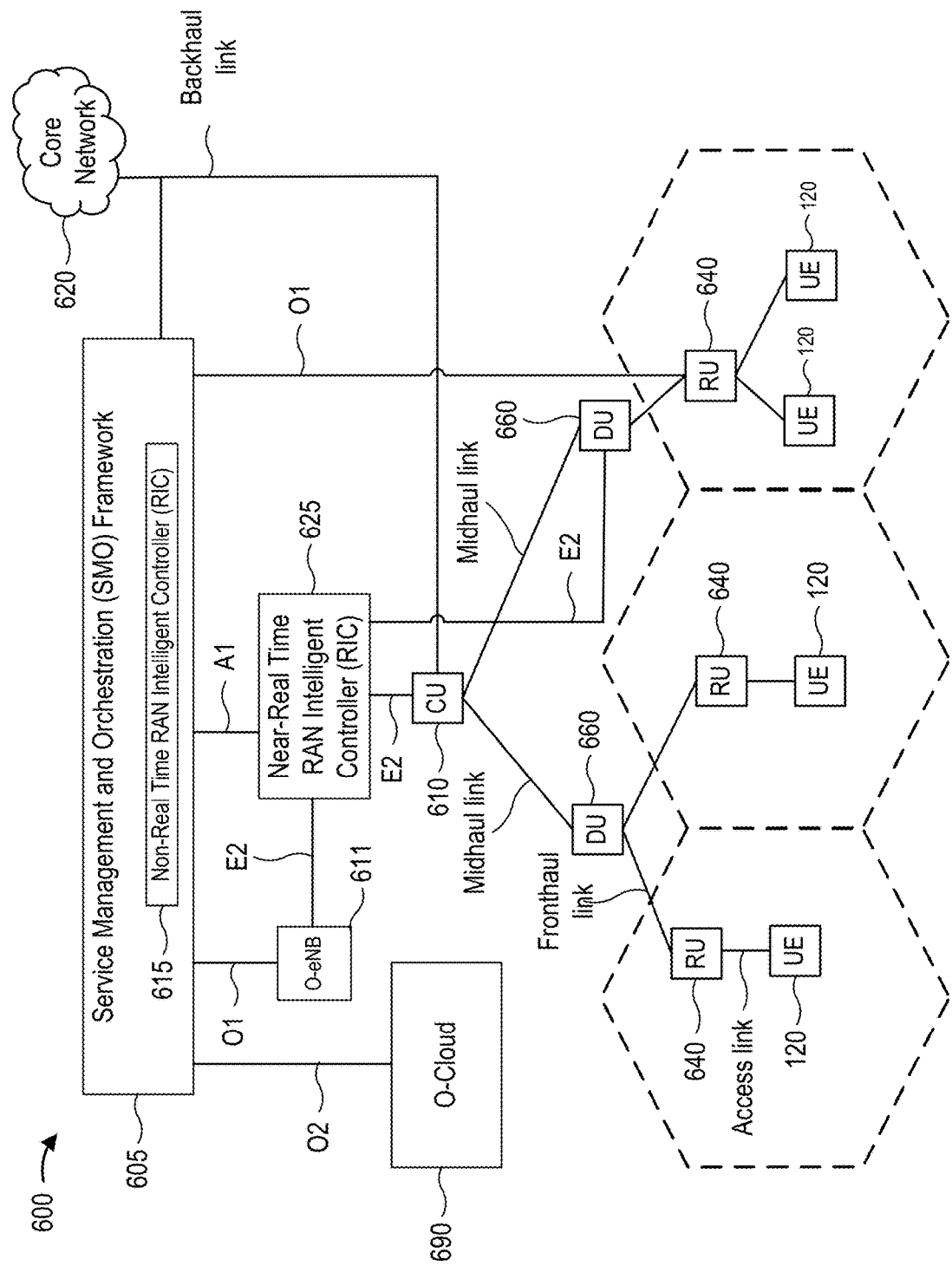
FIG. 6 shows a diagram illustrating an example disaggregated base station architecture

FIG. 6 shows a diagram illustrating an example disaggregated base station 600 architecture. The disaggregated base station 600 architecture may include one or more central units (CUs) 610 that can communicate directly with a core network 620 via a backhaul link, or indirectly with the core network 620 through one or more disaggregated base station units (such as a near-real time (near-RT) RAN intelligent controller (RIC) 625 via an E2 link, or a non-real time (non-RT) RIC 615 associated with a service management and orchestration (SMO) framework 605, or both). A CU 610 may communicate with one or more distributed units (DUs) 660 via respective midhaul links, such as an F1 interface. The DUs 660 may communicate with one or more radio units (RUs) 640 via respective fronthaul links. The RUs 640 may communicate with respective UEs 120 via one or more radio frequency (RF) access links. In some implementations, the UE 120 may be simultaneously served by multiple RUs 640.

Each of the units (for example, the CUs 610, the DUs 660, the RUs 640, as well as the near-RT RICs 625, the non-RT RICs 615, and the SMO framework 605) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 610 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 610. The CU 610 may be configured to handle user plane functionality (for example, central unit—user plane (CU-UP)), control plane functionality (for example, central unit—control Plane (CU-CP)), or a combination thereof. In some implementations, the CU 610 can be logically split into one or more CU-UP units and one or more CU-CP units. The CU-UP unit can communicate bi-directionally with the CU-CP unit via an interface, such as the E1 interface when implemented in an O-RAN configuration. The CU 610 can be implemented to communicate with the DU 660, as necessary, for network control and signaling.

The DU 660 may correspond to a logical unit that includes one or more base station functions to control the operation of one or more RUs 640. In some aspects, the DU 660 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (6GPP). In some aspects, the DU 660 may further host one or more low PHY layers. Each layer (or module) can be implemented with an interface configured to communicate signals with other layers (and modules) hosted by the DU 660, or with the control functions hosted by the CU 610.

Lower-layer functionality can be implemented by one or more RUs 640. In some deployments, an RU 640, controlled by a DU 660, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 640 can be implemented to handle over the air (OTA) communication with one or more UEs 120. In some implementations, real-time and non-real-time aspects of control and user plane communication with the RU(s) 640 can be controlled by the corresponding DU 660. In some scenarios, this configuration can enable the DU(s) 660 and the CU 610 to be implemented in a cloud-based RAN architecture, such as a vRAN architecture.

The SMO framework 605 may be configured to support RAN deployment and provisioning of non-virtualized and virtualized network elements. For non-virtualized network elements, the SMO framework 605 may be configured to support the deployment of dedicated physical resources for RAN coverage requirements, which may be managed via an operations and maintenance interface (such as an O1 interface). For virtualized network elements, the SMO framework 605 may be configured to interact with a cloud computing platform (such as an open cloud (O-cloud) 690) to perform network element life cycle management (such as to instantiate virtualized network elements) via a cloud computing platform interface (such as an O2 interface). Such virtualized network elements can include, but are not limited to, CUs 610, DUs 660, RUs 640, and near-RT RICs 625. In some implementations, the SMO framework 605 can communicate with a hardware aspect of a 4G RAN, such as an open eNB (O-eNB) 611, via an O1 interface. Additionally, in some implementations, the SMO framework 605 can communicate directly with one or more RUs 640 via an O1 interface. The SMO framework 605 also may include a non-RT RIC 615 configured to support functionality of the SMO framework 605.

The non-RT RIC 615 may be configured to include a logical function that enables non-real-time control and optimization of RAN elements and resources, artificial intelligence/machine learning (AI/ML) workflows including model training and updates, or policy-based guidance of applications/features in the near-RT RIC 625. The non-RT RIC 615 may be coupled to or communicate with (such as via an A1 interface) the near-RT RIC 625. The near-RT RIC 625 may be configured to include a logical function that enables near-real-time control and optimization of RAN elements and resources via data collection and actions over an interface (such as via an E2 interface) connecting one or more CUs 610, one or more DUs 660, or both, as well as the O-eNB 611, with the near-RT RIC 625.

In some implementations, to generate AI/ML models to be deployed in the near-RT RIC 625, the non-RT RIC 615 may receive parameters or external enrichment information from external servers. Such information may be utilized by the near-RT RIC 625 and may be received at the SMO framework 605 or the non-RT RIC 615 from non-network data sources or from network functions. In some examples, the non-RT MC 615 or the near-RT MC 625 may be configured to tune RAN behavior or performance. For example, the non-RT MC 615 may monitor long-term trends and patterns for performance and employ AI/ML models to perform corrective actions through the SMO framework 605 (such as reconfiguration via O1) or via creation of RAN management policies (such as A1 policies).

Artificial neural networks, such as deep generative models, may be used to estimate a channel, such as a wireless channel. A variational autoencoder (VAE) is an example of a deep generative model. During training, an encoding distribution of the VAE is regularized, such that a latent space of the VAE may generate new data. In some examples, the VAE may estimate a channel or properties associated with the channel based on one or more observations of the channel. In one such example, for medical imaging, the VAE may generate an entire image of an organ based on receiving one or more observations of the organ. As another example, upon receiving one or more observations of a channel, such as pilot symbols associated with the channel, the VAE may generate the channel, or properties associated with the channel, by finding the latent variable that generates the channel. In some examples, compressed sensing may reconstruct a signal from an underdetermined system of linear measurements. The compressed sensing solution may use prior knowledge of the signal to reconstruct the signal.

Figure 7:
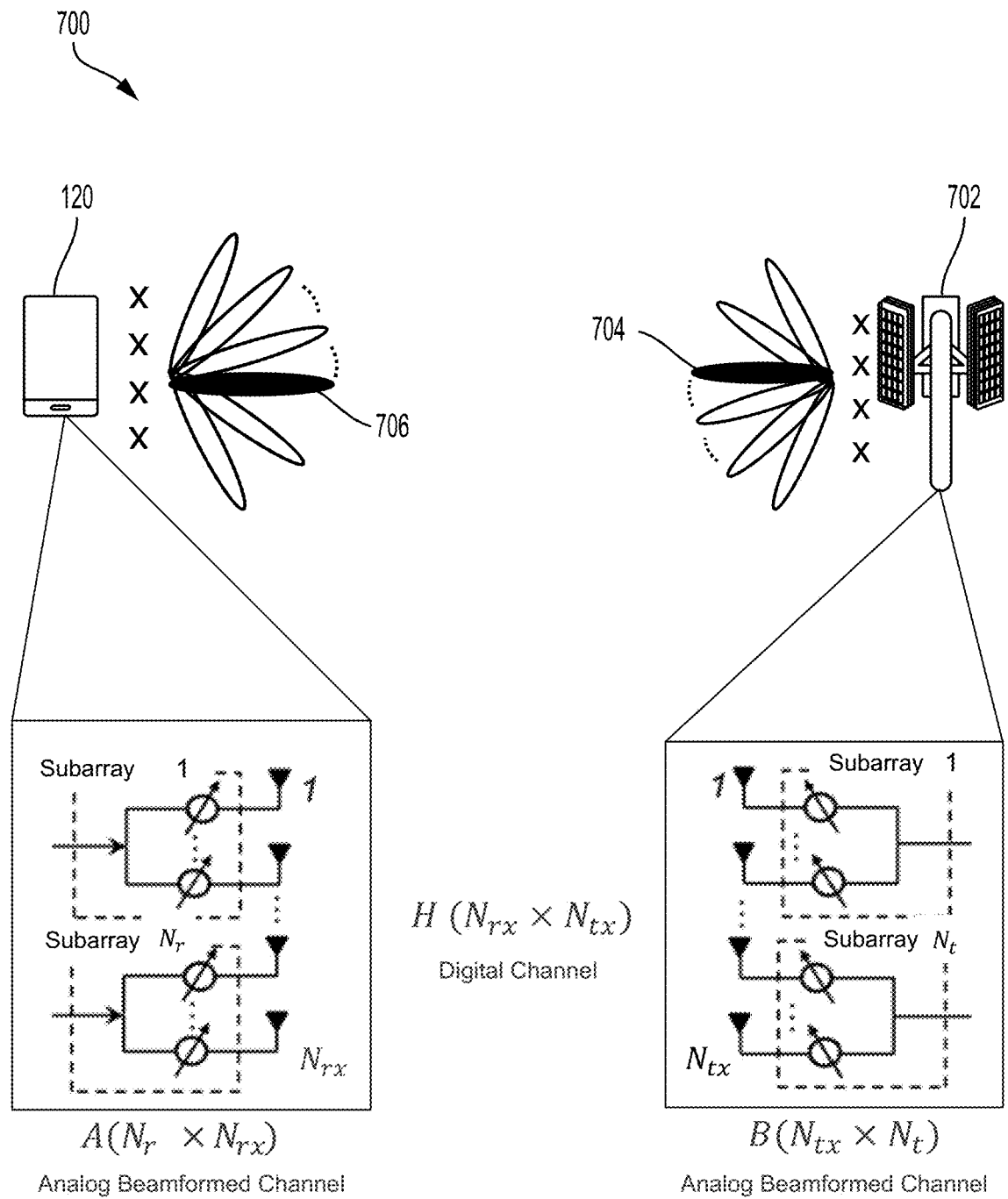
FIG. 7 is a block diagram illustrating an example of a wireless communication system, in accordance with various aspects of the present disclosure.

FIG. 7 is a block diagram illustrating an example of a wireless communication system 700, in accordance with various aspects of the present disclosure. In the example of FIG. 7, a UE 120 may communicate with a network node 702 via a channel H, such as a digital channel. As an example, the wireless communication system 700 may be a millimeter wave (mmWave) communication system or another type of digital communication system. The network node 702 may be an example of a base station 110 described with reference to FIGS. 1 and 2, or a CU 610, DU 660, or RU 640 described with reference to FIG. 6. The UE 120 may include multiple receiver antennas (1 to $N_r$) associated with multiple receiver subarrays (1 to $N_{rx}$), where the parameter $N_r$ represents a total number of receiver antennas and the parameter $N_{rx}$ represents a total number of receiver subarrays at the UE 120. The total number of receiver subarrays $N_{rx}$ may be greater than or equal to the total number of receiver antennas $N_r$. The network node 702 may include multiple antennas (1 to $N_t$) associated with multiple subarrays (1 to $N_{tx}$), where the parameter $N_t$ represents a total number of antennas and the parameter $N_{tx}$ represents a total number of subarrays at the network node 702. The total number of transmitter subarrays $N_{tx}$ may be greater than or equal to the total number of transmitter antennas $N_t$.

In the example of FIG. 7, the channel H, where $H \in \mathbb{C}^{N_{rx} \times N_{tx}}$, may be transmitted via an analog beamformed channel B from the network node 702 and received at the UE 120 via an analog beamformed channel A. The transmitted analog beamformed channel B may be beamformed in a first beam direction 704 and the received analog beamformed channel A may be received in a second beam direction 706. The channel H may be represented by a matrix having dimensions ($N_{rx} \times N_{tx}$), the transmitted analog beamformed channel B may be represented by a matrix having dimensions ($N_{tx} \times N_t$), and the received analog beamformed channel A may be represented by a matrix having dimensions ($N_r \times N_{rx}$). The channel H may be estimated based on an observation Y at the UE 120, where Y=AHB, and $Y \in \mathbb{C}^{N_{rx} \times N_{tx}}$. The observation Y may be reformulated as an inverse problem, vec(Y)=($B^T \otimes A$)vec(H), which is an example of an underdetermined problem.

In the example of FIG. 7, the channel H may be sparse in an angular domain. A structure of the channel H may be used for channel estimation. For example, the channel estimation problem may be an example of a sparse channel (e.g., sparse signal) recovery problem. In such examples, the angular space at the UE 120 and network node 702 may be discretized on grids of sizes $G_R$ and $G_T$, respectively, where the parameter $G_R$ represents a UE element response matrix and the parameter $G_T$ represents a network node element response matrix. The sparse channel $H_d$ may be recovered based on the following equation:

$$H_d \approx G_R \Delta_d{}^y G_T{}^* \Rightarrow \text{vec}(H_d) = [(G_T{}^*)^T \otimes G_R]\text{vec}(\Delta_d{}^y). \quad (1)$$

In Equation 1, $[(G_T{}^*)^T \otimes G_R]$ may be an example of a sparsifying dictionary $\Psi$. The channel estimation problem may be reformulated as follows:

$$Y=AHB \Rightarrow y=\text{vec}(Y)=[B^T \otimes A]H \Rightarrow y=[B^T \otimes A][(G_T{}^*)^T \otimes G_R]\text{vec}(\Delta_d)=\Phi\Psi z_d. \quad (2)$$

In Equation 2, the parameter $\Phi$ represents a function of beamforming matrices used for channel measurements and the parameter $z_d$ represents a sparse representation of the channel vector.

As discussed, compressed sensing may be used to reconstruct an unobserved channel (e.g., signal) $x \in \mathbb{R}^m$ from m linear measurements generated as an observation y=Ax+ε, where the parameter $A \in \mathbb{R}^{m \times n}$ represents a task-specific measurement matrix and the parameter ε represents additive noise. That is, the unobserved channel x may be recovered based on the observation y. Recovering the unobserved channel x based on the observation y is an example of an underdetermined problem.

Some conventional compressed sensing solutions assume the channel x is sparse in a given dictionary. For example, x=Dz, where a latent space variable z is sparse, and D is a dictionary. Such conventional compressed sensing solutions solve an inverse problem by solving an optimization problem, for example, min$\|z\|_1$ s.t. y=ADz, where $\|z\|_1 = \Sigma_i|z_1|$. In some examples, the sparsity bases may not be available. Additionally, or alternatively, the dimensions of the dictionary matrix may become large. Therefore, such conventional compressed sensing solutions may increase latency and/or increase a time for convergence of the compressed sensing solution (e.g., compressed sensing model).

Some other conventional compressed sensing solutions may train a generative model G(z) on the channel x, where the parameter z is a latent variable. Such conventional compressed sensing solutions may solve the inverse problem by gradient descent over the latent of G, for example min$\|y-AG(z)\|_2$. As an example, the generative model G(z) may be a generative adversarial network (GAN), a variational autoencoder (VAE), or a flow-based generative model. Such conventional compressed sensing solutions may also increase latency and/or increase a time for convergence of the compressed sensing solution (e.g., compressed sensing model).

In some examples, a rotation $r_\theta$ of the channel x may be unknown, where the parameter θ represents an angle of rotation. As an example, an orientation of a user equipment (UE) with respect to a base station or a beam direction may be unknown. As another example, a pose of the organ may be unknown. It may be desirable to recover the rotation $r_\theta$ and the channel x $r_\theta$x, or $r_\theta$, x) given an observation y=$Ar_\theta$x. The recovery of the rotation $r_\theta$ and the channel x is another example of an underdetermined problem. Some conventional solutions may perform an exhaustive search to recover the rotation $r_\theta$ and also perform joint gradient descent over the rotation $r_\theta$ and the channel x. Such solutions may also increase latency and/or increase a time for convergence of a model.

In some examples, the observation y=$Ar_\theta$x may be expressed as y=$AT_g$x+ε, where $T_g:G \times X \to X$ is an action of a group element g in a group G on the channel x (e.g., channel space). The group transformation $T_g$ is unknown.

Various aspects of the present disclosure are directed to using equivariant priors to solve inverse problems with unknown orientations. In some examples, an equivariant generative model encapsulates orientation information in its latent space. The equivariant generative model may include an equivariant variational autoencoder (VAE), and a decoder of the VAE may be used as a generative prior for compressed sensing. In such aspects, a channel with an unknown orientation may be recovered with iterative gradient descent on the latent space of the equivariant generative model. For ease of explanation, the equivariant generative model may be referred to as a generative model G(•), where a generator function G(•) maps a latent variable z to a space of a channel x In the generative model, for each action of rotation $r_\theta$ on the channel x, there an equivariant rotation $r'_\theta$, such that G($r'_\theta$z)=$r_\theta$x, and vice versa, where the parameter z is a latent variable. Accordingly, if the channel x is rotated to $r_\theta$x with an unknown angle θ, then $Ar_\theta$x=AG ($r'_\theta$z). Accordingly, if an input $r'_\theta$z of the generative model is rotated, the output $r_\theta$x is rotated as well. On the other hand, a rotated output $r_\theta$x (e.g., the channel x) corresponds to a rotated version of the latent value $r'_\theta$z. In some examples, the unknown transformation may be coded in a latent space and the channel may be estimated by estimating the transformed (e.g., rotated) latent code. According to aspects of the present disclosure, the solution may directly determine $r'_\theta$z, such that it may be unnecessary to individually determine the angle of rotation θ and $r'_\theta$. The generative model G(z) may be trained on inputs without data augmentation. Gradient descent may solve the following problem over the latent variable:

$$z^* = \underset{z}{\text{argmin}} \|y - AG(z)\|^2.$$

In some examples, an equivariant VAE may be trained to generate an equivariant prior.

Figure 8:
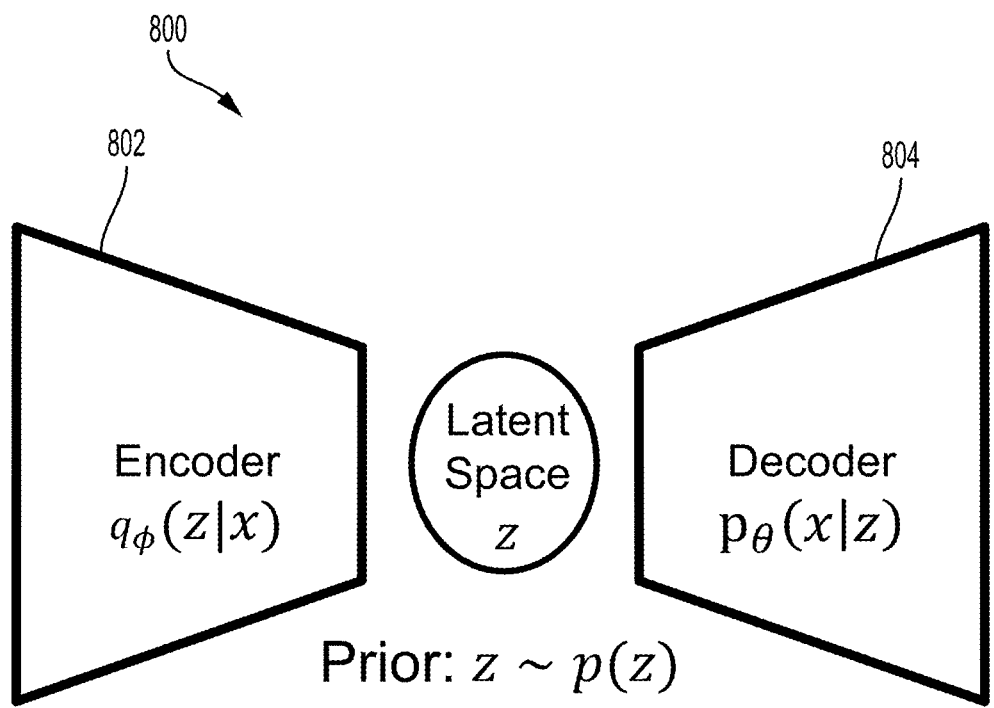
FIG. 8 is a block diagram illustrating an example of a variational autoencoder (VAE), in accordance with various aspects of the present disclosure.

The VAE is an example of a deep generative model that models a joint distribution of observed random variables $x \in X$ (e.g., $x \in \mathbb{R}^D$) and latent variables $z \in \mathbb{R}^d$ as $p_\phi(x,z) = p_\phi(x|z)p(z)$. The deep generative model may be trained to maximize a marginal likelihood $p_\phi(x)$ for a given set of points $x_1, \ldots, x_n$. FIG. 8 is a block diagram illustrating an example of a VAE 800, in accordance with various aspects of the present disclosure. In some examples, the VAE 800 may be included in a deep generative model. The VAE 800 is an example of a probabilistic unsupervised model. As shown in the example of FIG. 8, the VAE 800 includes an encoder 802 and decoder 804. The encoder 802 may be an example of an approximate posterior network and the decoder 804 may be an example of a generator.

In some examples, the encoder 802 may be represented by a function $q_\phi(z|x)$ that maps an input (e.g., a channel x) to a latent space z that is obtained from a prior p(z) (e.g., z~p(z)). That is, during a forward pass through the VAE 800, the encoder 802 returns parameters of the variational posterior $q_\phi(z|x)$. Then, the distribution may be sampled, such that $\tilde{z} \sim q_\phi(z|x)$. Reparameterization may obtain the sample, such that $\tilde{z} = \rho(x) + \Sigma(x)^{1/2} n$, where the parameter n represents zero mean unit variance random vectors. The decoder 804 may be represented by a function $p_\theta(x|z)$ that maps the latent space z to an output (e.g., a reconstruction of the channel x). In some examples, the sample $\tilde{z}$ may be received at the decoder 804 to return parameters of the generative distribution $p_\theta(x|\tilde{z})$. In such examples, the channel may be reconstructed based on the generative distribution (e.g., $\tilde{x} \sim p_\theta(x|z=\tilde{z})$).

The latent space z may be a random variable. Therefore, the VAE 800 may be trained to learn a distribution (e.g., Gaussian distribution) on the latent space z. Thus, the output of the encoder 802 may be a mean expected value (e.g., mean value associated with the channel x) and a variance associated with the distribution. The mean expected value may be a mean value of the distribution.

Conventional VAEs may not be equivariant. Therefore, various aspects of the present disclosure are directed to learning a symmetry-aware latent space during training, such that the VAE 800 is equivariant. That is, both the encoder 802 and the decoder 804 are trained to be equivariant.

For the decoder 804, the reconstructed channel x that is output from the decoder 804 should be rotated based on a rotation of the latent variable z that is input to the decoder 804. That is, the decoder 804 may receive a rotated latent variable g'z and output a rotated channel $x_{g'}$ based on the generative distribution $(p_\theta(x|g'z)$ (e.g., $x_{g'} \sim p_\theta(x|g'z))$, where the parameter g' represents a rotation operation. Accordingly, when the decoder 804 is equivariant, an equality in a distribution of the rotated channel gx may be equal to the equality in a distribution of the reconstructed rotated channel $x_{g'}$ (e.g., $g'z =^d z_g$, where $=^d$ represents an equality in a distribution). For the encoder 802, a rotated channel $r_\theta x$ received as an input should generate a rotated distribution of the latent variable z as an output. That is, the encoder 802 samples the variational posterior $q_\phi$ using the rotated channel gx received, as an input, to sample a rotated distribution $z_g$ (e.g., $z_g \sim q_\phi(z|gx)$), where the parameter g represents a rotation operation. Accordingly, when the encoder 802 is equivariant, an equality in a distribution $z_g$ of the latent variable z may be equal to the equality in a distribution of the rotated latent variable g'z (e.g., $g'z =^d z_g$). In other words, for the encoder 802 to be equivariant, sampling a latent code for a variational posterior conditioned on the transformed input gx should be the same as transforming a latent code that is sampled from the variational distribution conditioned on the non-transformed input x.

In some examples, the equivariant encoder 802 may be parameterized as a Gaussian that is determined by two subnetworks: a mean value network $\mu(\bullet)$ and a variance network $\Sigma(\bullet)$. In some examples, the mean value network $\mu(\bullet)$ may be equivariant. That is, the mean value network $\mu(\bullet)$ should be conditioned to satisfy the following equation:

$$E(z_g) = g'E(z) \rightarrow \mu(gx) = g'\mu(x) \quad (3)$$

In Equation 3, when the rotated distribution $z_g$ is equivalent to a rotation of the latent variable z (e.g., $E(z_g) = g'E(z)$), then then expected value (e.g., mean value) of the rotated channel $\mu(gx)$ should be equivalent to a rotation of the expected value of the channel $g'\mu(x)$ (e.g., $\mu(gx) = g'\mu(x)$). The mean value network $\mu(\bullet)$ satisfies the property of Equation 3 when an equivariant neural network is used to model the mean function $\mu(\bullet)$. Additionally, E( ) is a function for an expected value.

Additionally, the variance network $\Sigma(\bullet)$ should satisfy the following equation:

$$E(z_g z_g^T) = g'E(zz^T)g'^T \rightarrow \Sigma(gx) = g'\Sigma(x)g'^T. \quad (4)$$

In Equation 4, when a product of the rotated distribution $z_g$ and a transpose of the rotated distribution $z_g^T$ is equal to a rotation of the latent variable z, a transpose of the latent variable $z^T$, and a transpose of the rotation $g'^T$ (e.g., $E(z_g z_g^T) = g'E(zz^T)g'^T$), the variance of the rotated channel $\Sigma(gx)$ should be equivalent to a rotation of the variance of a product of the variance of the channel and a transpose of the rotation $g'\Sigma(x)g'^T$ (e.g., $\Sigma(gx) = g'\Sigma(x)g'^T$). Accordingly, the variance network $\Sigma(\bullet)$ may be bi-equivariant, such that a latent variable z may be sampled. The Gaussian distribution of the latent variable z may be reparametrizable, such that $z = \mu + L\epsilon$, $\epsilon \sim N(0, I)$, where L is a matrix. Additionally, a Kullback-Leibler (KL)-divergence may be calculated when the variance network $\Sigma(\bullet)$ is bi-equivariant. The KL-divergence may be expressed as:

$$\frac{1}{2}(-\log|\Sigma| - d + tr[\Sigma] + \mu^T\mu) \quad (5)$$

Conventional autoencoders, such as diagonal autoencoders, use a diagonal covariance matrix, such that $\Sigma(x) = \text{diag }\sigma(x)$. In the example of FIG. 8, the covariance of the rotated channel $\Sigma(gx)$ may remain diagonal. However, the rotation of the covariance of the channel $g'\Sigma(x)g'^T$ may not remain diagonal. Therefore, aspects of the present disclosure use a non-diagonal covariance matrix. Additionally, while using the non-diagonal covariance matrix, the encoder 802 is specified to maintain its ability to sample the latent variable z, to compute a log-determinant on the forward pass, and to maintain a positive definite matrix. Thus, a full-rank covariance matrix V(x) may be used in variance network $\Sigma(\bullet)$.

In some examples, the covariance matrix may be parametrized as $V(x)V(x)^T$, where V(x) is an arbitrary equivariant d×d matrix, such that $\Sigma(x) = V(x)V(x)^T$. In such examples, a Cholesky decomposition: $\Sigma = LL^T$ may be used for sampling. For example, the sampling may be as follows:

$$\log|\Sigma| = \log|LL^T| = \log|L|^2 = \log \Pi_i L_{ii}^2 = 2\Sigma_i \log L_{ii} \quad (6)$$

In some other examples, a spectral decomposition of the covariance matrix is used, such that $\Sigma(x) = V(x)D(x)V(x)^T$, where V(x) is an equivariant, orthogonal d×d matrix and D(x) is an invariant, diagonal d×d matrix.

In the example of FIG. 8, the decoder 804 is also equivariant. In some examples, the decoder 804 may be conditioned to satisfy the following equation:

$$E(x_{g'}) = gE(x) \rightarrow \mu(g'z) = g\mu(z) \quad (7)$$

In Equation 7, when the rotated channel $x_{g'}$ is equivalent to a rotation of the channel x (e.g., $E(x_{g'}) = gE(x)$), then then expected value (e.g., mean value) of the rotated latent variable $\mu(g'z)$ should be equivalent to a rotation of the latent variable $g\mu(z)$ (e.g., $\mu(g'z) = g\mu(z)$).

Additionally, during training, the VAE 800 may learn a low dimensional latent space by maximizing evidence lower bound (ELBO) $\mathcal{L}(\theta, \phi)$. The ELBO may be maximized as follows:

$$\mathcal{L}(\theta,\phi)=E_{q_\phi(z|x)} \log p_\theta(x|z)-\text{KL}(q_\phi(z|x)\|p(z)). \quad (8)$$

In Equation 8, $E_{q_\phi(z|x)} \log p_\theta(x|z)$ represents a reconstruction loss and $(q_\phi(z|x)\|p(z))$ represents a divergence between the variational posterior $q_\phi(z|x)$ and the prior $p(z)$.

During training, the VAE 800 may receive an input, such as a channel x, to optimize a reconstruction loss at the output of the VAE 800. Because the VAE 800 is probabilistic, the VAE 800 learns a reconstruction that follows a specific distribution associated with a prior $p(z)$. Thus, the latent space z follows a Gaussian distribution. Additionally, the Gaussian distribution may be parameterized through a mean value $\mu(x)$ and a variance $\Sigma(x)$. Thus, as discussed, the encoder 802 includes a mean value network and a variance network. The variance network may also be referred to as a covariance network or an expected value network. The distribution of the input (e.g., channel x) may be determined based on the mean value $\mu(x)$ and the variance $\Sigma(x)$ of the input. The encoder 802 may sample from the distribution. Thus, the encoder 802 may be represented as:

$$q_\phi(z|x)=N(z|\mu(x),\Sigma(x)),p(z)=N(0,1), \quad (9)$$

where $N(0,1)$ represents a normal distribution.

As discussed, during training, the VAE 800 receives an input, such as a channel x. During a forward pass, the encoder 802 determines the mean value $\mu(x)$ of the input and an expected value of the input based on the covariance $\Sigma(x)$. As discussed, the covariance matrix may be parametrized as $V(x)V(x)^T$. Additionally, a Cholesky decomposition: $\Sigma=LL^T$ (e.g., $L=\text{Chol}(\Sigma)$) may be used for sampling. The encoder 802 may then obtain a sample $\tilde{z}$ from the latent space z based on the mean value $\mu(x)$ and the expected value of the input based on the covariance $\Sigma(x)$ (e.g., $z=\mu+L\varepsilon$, $\varepsilon\sim N(0, I)$). The VAE 800 may then determine the Kullback-Leibler (KL)-divergence (e.g., $\text{KL}(q_\phi(z|x)\|p(z))$) which provides a divergence between the variational posterior $q_\phi(z|x)$ and the prior $p(z)$. The sample $\tilde{z}$ may then be processed by the decoder $p_\theta(x|z=\tilde{z})$ to obtain a reconstruction of the input $\tilde{x}$ (e.g., $\tilde{x}\sim p_\theta(x|z=\tilde{z})$). A reconstruction loss may be determined based on the reconstruction of the input $\tilde{x}$. The reconstruction loss may be defined as $E_{q_\phi(z|x)} \log p_\theta(x|z)$ (e.g., $\text{Re}=-\log p_\theta(x|z)$). The VAE 800 may then determine the ELBO $\mathcal{L}(\theta, \phi)$ based on the reconstruction loss and the KL-divergence (e.g., $\mathcal{L}(\theta, \phi)=E_{q_\phi(z|x)} \log p_\theta(x|z)-\text{KL}(q_\phi(z|x)\|p(z))$).

Figure 9:
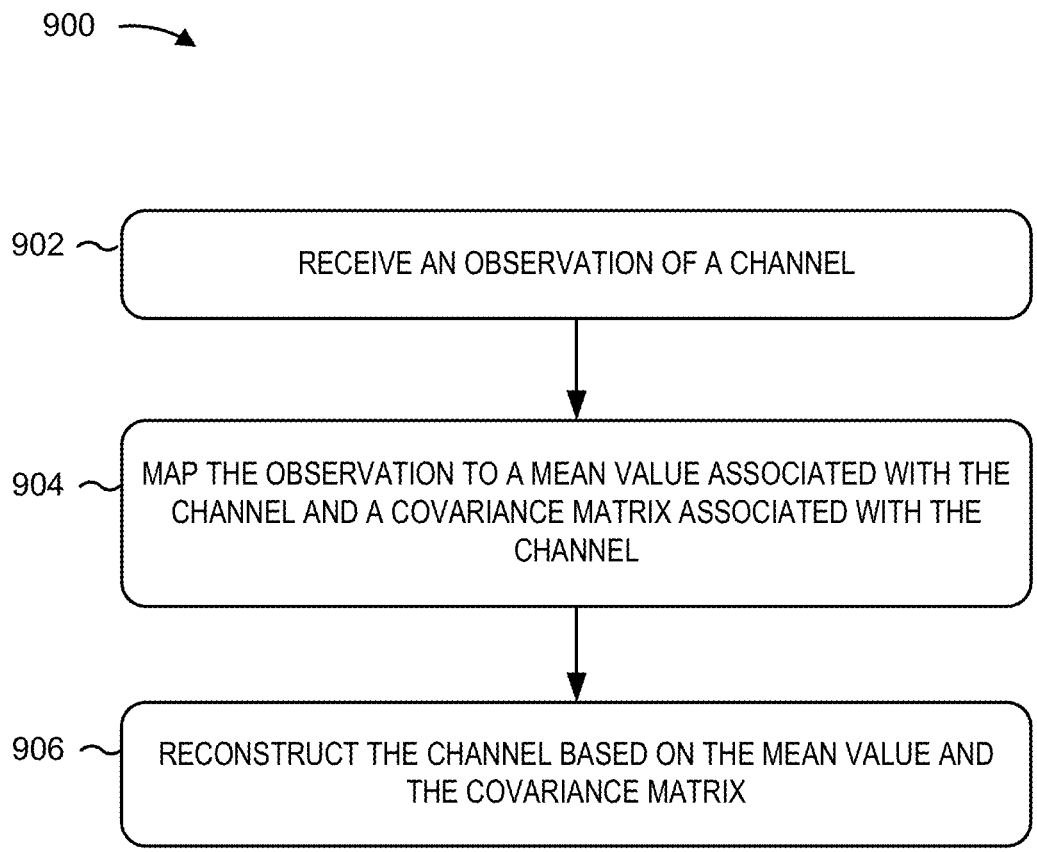
FIG. 9 is a flow diagram illustrating an example process performed, for example, by a deep generative model, in accordance with various aspects of the present disclosure.

FIG. 9 is a flow diagram illustrating an example process 900 performed, for example, by a deep generative model, in accordance with various aspects of the present disclosure. In some examples, the deep generative model includes a VAE (e.g., equivariant VAE), such as the VAE 800 described with reference to FIG. 8. The deep generative model may be a component of a wireless device, such as a UE 120 or a base station 110 described with reference to FIGS. 1, 2, 6, and 7, or a network node 702 described with reference to FIG. 7. The process 900 is an example of reconstructing a channel, where a rotation of the channel is unknown.

As shown in the example of FIG. 9, at block 902, the process 900 begins by a device (e.g., a UE, BS, network node, or the like) receiving an observation of the channel. The channel may be an example of a wireless communication channel.

At block 904, the device maps the observation to a mean value associated with the channel and a covariance matrix associated with the channel. Specifically, in some examples, the observation is mapped to the mean value and the covariance matrix at an equivariant encoder of the equivariant VAE. In some examples, the device may generate a latent space representation based on the mean value and the covariance matrix.

At block 906, the device reconstructs the channel based on the mean value and the covariance matrix. In some examples, the channel may be reconstructed based on the latent space representation. Additionally, the channel may be reconstructed at an equivariant decoder of the equivariant VAE.

Implementation examples are described in the following numbered clauses.

Clause 1. A method for estimating a channel by a deep generative model, comprising: receiving an observation of the channel; mapping the observation to a mean value associated with the channel and a covariance matrix associated with the channel; and reconstructing the channel based on the mean value and the covariance matrix.

Clause 2. The method of Clause 1, in which the deep generative model comprises an equivariant variational auto-encoder (VAE).

Clause 3. The method of Clause 2, in which the observation is mapped to the mean value and the covariance matrix at an equivariant encoder of the equivariant VAE.

Clause 4. The method of Clause 2, in which the channel is reconstructed at an equivariant decoder of the equivariant VAE.

Clause 5. The method of any one of Clauses 1-5, further comprising generating a latent space representation based on the mean value and the covariance matrix.

Clause 6. The method of Clause 5, in which reconstructing the channel comprises reconstructing the channel based on the latent space representation.

Clause 7. The method of any one of Clauses 1-7, in which the channel is a wireless communication channel.

Clause 8. An apparatus for estimating a channel, comprising means for causing a deep generative network to perform any one of Clauses 1-7.

Clause 9. An apparatus for estimating a channel comprising: a processor; and a memory coupled with the processor and storing instructions operable, when executed by the processor, to cause a deep generative network to carry out any one of Clauses 1-7.

Clause 10. A non-transitory computer-readable medium having program code recorded thereon for estimating a channel comprising, the program code executed by a processor and comprising program code to cause a deep generative network to perform any one of Clauses 1-7.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A processor-implemented method for estimating a channel by a deep generative model, comprising:
   receiving, at a device, an observation of the channel;
   mapping, at the device, the observation to a mean value and a covariance matrix that together define a probability distribution representing an estimate of the channel associated with the observation; and
   reconstructing, at the device, the channel based on the mean value and the covariance matrix.

2. The processor-implemented method of claim 1, in which the deep generative model comprises an equivariant variational autoencoder (VAE).

3. The processor-implemented method of claim 2, in which the observation is mapped to the mean value and the covariance matrix at an equivariant encoder of the equivariant VAE.

4. The processor-implemented method of claim 2, in which the channel is reconstructed at an equivariant decoder of the equivariant VAE.

5. The processor-implemented method of claim 1, further comprising generating a latent space representation based on the mean value and the covariance matrix.

6. The processor-implemented method of claim 5, in which the channel is reconstructed based on the latent space representation.

7. The processor-implemented method of claim 1, in which the channel is a wireless communication channel.

8. The processor-implemented method of claim 1, further comprising training the deep generative model by mapping the observation to a latent code associated with the channel based on gradient descent over a latent space.

9. An apparatus for estimating a channel, comprising:
   means for receiving, at a device, an observation of the channel;
   means for mapping, at the device, the observation to a mean value and a covariance matrix that together define a probability distribution representing an estimate of the channel associated with the observation; and
   means for reconstructing, at the device, the channel based on the mean value and the covariance matrix.

10. The apparatus of claim 9, in which the apparatus comprises means for equivariant variational autoencoding.

11. The apparatus of claim 10, in which the means for equivariant variational autoencoding comprises means for equivariant encoding.

12. The apparatus of claim 10, in which the means for equivariant variational autoencoding comprises means for equivariant decoding.

13. The apparatus of claim 9, further comprising means for generating a latent space representation based on the mean value and the covariance matrix.

14. The apparatus of claim 13, in which the means for reconstructing the channel comprises means for reconstructing the channel based on the latent space representation.

15. The apparatus of claim 9, in which the channel is a wireless communication channel.

16. The apparatus of claim 9, further comprising means for training a deep generative network associated with the apparatus, the means for training comprising means for mapping the observation to a latent code associated with the channel based on gradient descent over a latent space.

17. An apparatus for estimating a channel via a deep generative model, comprising:
   at least one processor; and
   at least one memory coupled with the at least one processor and storing instructions operable, when executed by the at least one processor, to cause the apparatus to:
   receive an observation of the channel;
   map the observation to a mean value and a covariance matrix that together define a probability distribution representing an estimate of the channel associated with the observation; and
   reconstruct the channel based on the mean value and the covariance matrix.

18. The apparatus of claim 17, in which the deep generative model comprises an equivariant variational autoencoder (VAE).

19. The apparatus of claim 18, in which the observation is mapped to the mean value and the covariance matrix at an equivariant encoder of the equivariant VAE.

20. The apparatus of claim 18, in which the channel is reconstructed at an equivariant decoder of the equivariant VAE.

21. The apparatus of claim 17, in which execution of the instructions further cause the apparatus to generate a latent space representation based on the mean value and the covariance matrix.

22. The apparatus of claim 21, in which execution of the instructions further cause the apparatus to reconstruct the channel based on the latent space representation.

23. The apparatus of claim 17, in which the channel is a wireless communication channel.

24. The apparatus of claim 17, in which execution of the instructions further cause the apparatus to train the deep generative model by mapping the observation to a latent code associated with the channel based on gradient descent over a latent space.

25. A non-transitory computer-readable medium having program code recorded thereon for estimating a channel via a deep generative model, the program code executed by a processor and comprising:
   program code to receive an observation of the channel;
   program code to map the observation to a mean value and a covariance matrix that together define a probability distribution representing an estimate of the channel associated with the observation; and
   program code to reconstruct the channel based on the mean value and the covariance matrix.

26. The non-transitory computer-readable medium of claim 25, in which the deep generative model comprises an equivariant variational autoencoder (VAE).

27. The non-transitory computer-readable medium of claim 26, in which the observation is mapped to the mean value and the covariance matrix at an equivariant encoder of the equivariant VAE.

28. The non-transitory computer-readable medium of claim 26, in which the channel is reconstructed at an equivariant decoder of the equivariant VAE.

29. The non-transitory computer-readable medium of claim 25, in which the program code further comprises program code to generate a latent space representation based on the mean value and the covariance matrix.

30. The non-transitory computer-readable medium of claim 29, in which the program code further comprises program code to reconstruct the channel based on the latent space representation.

* * * * *